3,379,645
PROCESS AND COMPOSITION FOR REMOVING
PROTECTIVE PAINT FILMS
Earl W. Kendall, San Diego, Calif., assignor to Rohr
Corporation, a corporation of California
No Drawing. Filed Nov. 15, 1965, Ser. No. 507,671
6 Claims. (Cl. 252—100)

ABSTRACT OF THE DISCLOSURE

An immersion or brush-on type paint film remover is used to remove protective paint films of highly polymerized resinous base materials such as epoxies, acrylics, vinyls, polyurethanes, polyamides, silicones, and zinc chromate and adhesive bonding primers from aluminum, ferrous metals and titanium without removing "Alodine" or the like protective films and without etching the underlying metallic surfaces. The composition of the remover, whether used for immersion or brush-on application consists of from 175–225 grams of sulfuric acid (specific gravity 1.84) and from 15–25 grams of chromic acid ($CrO_3$) and is prepared by slowly adding the chromic acid in finely divided state to the sulfuric acid while the same is vigorously agitated to form a brown colored suspension. Removal by immersion takes about 5 to 30 minutes in a non-aqueous solution of the composition material operated at ambient temperature. The solution composition is rendered thixotropic and suitable for brush-on application by the addition of from 0.5–5.0 grams of sub-microscopic pyrogenic silica ("Cabosil"). A two inch moisture barrier layer of carbon tetrachloride ($CCl_4$) is floated on the top of the immersion solution to prevent the influx of water.

Background of the invention

This invention relates generally to paint removers and more particularly to a process and composition for removing protective paint films of a resinous base type from metallic surfaces such as aluminum and its alloys, stainless steels, the high nickel alloys, and titanium.

Various pain remover methods and compositions have heretofore been effective for the purpose of removing certain of the resinous base materials without accompanying metal loss. Such removers or strippers are generally of a solvent type, being either acid or ammonia activated. In the action of these strippers, the paint film is removed in a detachment operation wherein methylene chloride, for example, penetrates and works beneath the film, and with a swelling action lifts the paint from the metallic surface. Paint removers of this solvent type, however, generally are not satisfactory in use to remove highly polymerized types of resinous materials because of the inability of the remover material to penetrate through the film structure to reach the paint-metal interface.

Various other methods and compositions have been tried, without success, to remove the impenetrable highly polymerized film types, such as by resorting to a disintegrating action on the film which acts directly thereon. For such purpose, the disintegrating material must necessarily be acidic or caustic in nature. Caustic materials, however, cannot be used because of their attack on the underlying metallic surface, particularly when this is aluminum. Similarly, acids which will vigorously attack the paint film will also attack the metal surface with a disastrous weight loss. Weak acids on the other hand which might greatly reduce the weight loss have little or no distintegrating effect on the paint film.

Chromic acid, with and without additives, has been used with some degree of success in the stripping of aluminum, but the accompanying weight loss has usually been considered objectionable. Chromic acid has also been tried together with nitric acid, but the nitric acid is not workable or practical for several reasons. It normally requires the use of glass containers, the nitric acid is toxic, the nitric oxide fumes are considered objectionable, and the nitric acid when effective to disintegrate the resinous coating, also removes the underlying chemical conversion films such as "Alodine."

Summary of the invention

In accordance with the present invention, a mineral acid such as sulfuric acid, or the equivalent, is employed which vigorously disintegrates the paint film without an accompanying attack of the underlying metallic surface. This is accomplished in the paint remover composition of the present invention by the addition to the mineral acid of an oxidizing agent such as chromic acid ($CrO_3$), or the equivalent, which inhibits the attack of the acid on the substrative material while at the same time being ineffective to impair the attack of the acid on the paint film. As otherwise expressed, the acid in association with its etchant inhibitor is nevertheless fully effective to disintegrate the paint film while the inhibitor on the other hand is fully effective to prevent any etchant action of the acid on the underlying metal surface.

The composition of the acid and inhibitor of the present invention is non-aqueous, and precautions must be taken to prevent the influx of water or moisture into the composition. In practice, the composition may either be in the form of an immersion solution or in the form of a brush on or so-called "mud" type, otherwise known as a "thixotropic" composition. When used in the form of an immersion solution, a suitable moisture barrier layer of approximately two inches in depth of carbon tetrachloride, or the equivalent, is floated on the surface of the composition solution. The thixotropic composition on the other hand requires the addition of a suitable thickener such as sub-microscopic pyrogenic silica, or the equivalent.

In either form of the composition, the same is operative at ambient temperature and is effective in from five to thirty minutes to remove the resinous coating without removing the "Alodine" or the like protective film, and also without attacking or etching the underlying metallic surface.

Objects of the invention

An object of the present invention therefore is to provide a new and improved paint remover composition and method which removes the highly polymerized resin base paint films by a process of disintegration.

Another object is to provide a paint remover material which is acidic in nature and yet will not attack the underlying metallic material.

Another object is to provide an acidic type of paint remover material which will operate with a disintegrating action to remove the paint film in association with an inhibitor which will serve to prevent attack of the acid on the underlying metallic surface.

A further object resides in the provision of a non-aqueous acidic type of paint remover material operative in association with an oxidizing material which functions as an etchant inhibitor.

Another object is to provide a non-aqueous acidic type of paint remover material in the form of an immersion type compatible for use with a moisture barrier which can be floated on the surface of the composition solution.

Yet another object is to provide a moisture barrier which can be floated on the surface of the acidic stripper material and which further is characterized by being heavier than water to thus prevent the water or moisture from reaching the stripper material.

An additional object is to provide an acidic type of paint stripper of the aforedescribed character which optionally may be in the form of an immersion solution or in the form of a brush-on so-called "mud" type.

Still another object is to provide an acidic-oxidizer type paint remover which is operative at ambient temperature and effective in a matter of several minutes to disintegrate and strip highly polymerized resinous coatings without attacking the underlying metallic surface or a chemical conversion film which may have been applied thereto.

Still other objects, features and advantages of the present invention will become more clearly apparent as the description proceeds in greater detail with respect to specific embodiments and examples of the invention.

Specification

The paint film remover of the present invention whether used as an immersion solution or as a brush-on material of the so-called "mud" type, is formed from the same basic starting materials which consists of the following inegredients in the proportions indicated in accordance with the following formulation:

Basic formulation: Grams
    Sulfuric acid (specific gravity 1.84) _____ 175–225
    Chromic acid ($CrO_3$) _____ 15–25

According to this formulation, 15 to 25 grams of chomic acid ($CrO_3$) are employed for each 175 to 225 grams of sulfuric acid used in any given solution wherein these composition constituents are admixed to form a non-aqueous composition. As indicated, the sulfuric acid is concentrated. The chromic acid is commercially available in the form of flakes, and to facilitate the admixing of the constituents, the chromic acid must be reduced to a finely divided state as by powdering or grinding the flakes. The finely divided chromic acid is then slowly added to the sulfuric acid while the same is vigorously agitated as by use of a motor driven impeller, or the like.

As the admixing of these components takes place, the first visible reaction is that the sulfuric acid, being a water-white material, takes on a reddish appearance due to the dissolving action of the chromic acid. As the admixing progresses, the red color darkens and becomes indicative of the formation of a definite brown chromium dioxide suspension. The admixing action is continued until all of the chromium acid material has been converted over to the brown chromium dioxide state. When the brown suspension becomes fully manifested in the solution, it indicates that the reaction is complete and the material is now ready to be used as a paint stripper.

While the equation of the reactions is not definitely known, it can probably be assumed or theorized that the reaction between the sulfuric acid and the chromic acid ($CrO_3$) will produce three materials or end products, namely, peroxysulfuric acid, chromic acid ($H_2CrO_4$), and chromium dioxide. These reacting materials, namely, the sulfuric acid and the chromic acid and the end products therefrom can be set forth in a chemical reaction which can be balanced chemically, as set forth in the following equation:

$$2H_2SO_4 + 2CrO_3 \rightarrow H_2S_2O_8 + H_2CrO_4 + CrO_2$$

A detailed analysis of this reaction and equation may be described as follows. In accordance with the formulation of the stripper composition, the chromic acid ($CrO_3$) is present in the composition in excess of the amount required for stoichiometric reaction with the water inherently present in the composition, or that which may inadvertently be added to the same as by absorption, or as a result of the disintegration of the resinous coating, or by other means. A stoichiometric amount of the chromic acid ($CrO_3$) reacts with the water inherent in the concentrated sulfuric acid according to the basic equation:

(1)         $CrO_3 + H_2O \rightarrow H_2CrO_4$

In accordance with the formulation, the sulfuric acid is in excess of the amount required for stoichiometric reaction with the chromic acid ($CrO_3$) which remains after the reaction of Equation 1, the reaction then being according to the following equation:

(2)    $2CrO_3 + 2H_2SO_4 \rightarrow H_2S_2O_8 + H_2CrO_4 + CrO_2$

If additional water inadvertently reaches the stripper solution, for any of the reasons as noted above, portions of the chromium dioxide and peroxysulfuric acid will react stoichiometrically with the water in accordance with the following equation:

(3)    $H_2S_2O_8 + CrO_2 + 2H_2O \rightarrow H_2CrO_4 + 2H_2SO_4$

As long as the chromium dioxide remains as a suspension in the stripper solution, water is thus effectively counteracted and removed by the reaction of Equation 3. In the event the water is not thus removed, the tendency will then be to ionize the sulfuric acid, in which state it will more vigorously attack aluminum, even in the presence of the chromic acid ($H_2CrO_4$) which tends to inhibit such action. In the absence of the ionization, however, the chromic acid ($H_2CrO_4$) is fully effective to inhibit any tendency of the sulfuric to attack any of the metals to which the stripper solution is applicable.

An example of the formation of water as a result of the disintegrating action on a resinous coating such as an epoxy is given by the following equation:

(4) 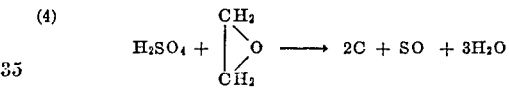

The water thus formed in the reaction of Equation 4 would then react as in Equation 3.

The sulfuric acid is the disintegrating element in the composition. The peroxysulfuric acid and chromic acid ($H_2CrO_4$) are the inhibiting media which prevent any attack of the sulfuric acid on the basis metal. This inhibiting action is believed to be due to the presence of oxygen-bearing materials, namely, the peroxysulfuric acid and the chromic acid ($H_2CrO_4$), which are present as two of the end products in the solution and which furnish oxygen to inhibit the etchant attack of the sulfuric acid. To further mitigate the effect of the sulfuric acid on the metal, the chromium dioxide which is a heavy brown suspension in the solution forms a rather thick coating over the metal to thus further prevent any damage to that material by the effect of the sulfuric acid after the paint has been stripped from the surface.

In actual practice, five 1 inch by 2 inch samples of unclad aluminum were subjected to the effect of the foregoing paint remover formulation, and after a period of 168 hours the samples showed an average increase in weight of 0.3 mg. This indicates a weight increase of 0.00045 mg. per square inch per hour. The fact that the metal gained in weight indicates that an inhibiting action took place. It is theorized that an extremely thin chromate film has formed on the metal as a protective barrier against attack by the sulfuric acid. It is conceivable that this theory is sound since no other film can possibly form owing to the nature of the composition and its components.

To determine whether metals other than aluminum would suffer any weight loss, samples of stainless steel No. 321, Hastelloy C, and the precipitation hardened steel PH 15–7 Mo, were subjected to the effect of the paint stripper solution. There was no accompanying weight loss and therefore no attack on any of these metals, thereby evidencing the inhibiting effect of the acidic-oxidizer materials in the solution. Other tests were conducted on metal samples having a conversion film such, for example, as Alodine 1200. In these tests the resistance of the conversion film to the paint stripper formulation was tested by immersing a panel coated with this conversion film for a period of 72 hours with no apparent degradation of the film.

In summarizing the test results and the effect of the formulation designed as a paint removing composition, it thus appears that aluminum and its alloys, the 300 series stainless steels, Hastelloy, precipitation hardening steels, or any of the high nickel alloys may be effectively stripped without accompanying harmful effects. Although it is known that the paint stripper formulation is suitable to strip paint from such substrative materials as hereinbefore specifically mentioned as being exemplary of the efficacy of the stripper material for the purpose, it will be understood that the same is not necessarily limited in use to such metals but is well adapted for use on titanium for example, and may be used on other metals such as the ferrous group. It should be noted, however, that this paint remover material cannot be used on magnesium.

To indicate the effectiveness of this stripper or paint remover on various types of resinous coatings, a number of tests have been run successfully in which the following materials were removed from the basis metal:

Skydrol resistant finish primer (so-called SRF primer)
Zinc chromate primer
Acrylic films
Vinyl acrylics
Adhesive bonding primers
Epoxy polyamide films
Aluminum silicone paints
Polyurethanes The foregoing films can be categorized as highly polymerized resinous-base materials which are extremely difficult to remove from metal because of the inability of commercially available paint removers to penetarte these films. The removal rate in the use of the composition of the present invention is between 5 and 30 minutes on complete immersion of the film in the paint remover solution.

The paint film remover composition of the present invention is customarily used as an immersion-type in which the painted parts are completely immersed within the solution for a period of time. Since this solution is a non-aqueous bath, precautionary measures must be taken to exclude the absorption or influx of water into the solution. This is accomplished by the use of a barrier material such as carbon tetrachloride which has a specific gravity heavier than water and somewhat lighter than the basic materials in the stripper solution. Such material is neither miscible nor reactive with the basic materials, nor with water. Its purpose is to float on the surface of the paint remover and thus exclude water from becoming a part of the basic material.

| Immersion solution formulation: | Grams |
| --- | --- |
| Sulfuric acid (sp. gr. 1.84) | 175–225 |
| Chromic acid ($CrO_3$) | 15–25 |
| $CCl_4$ | (¹) |

¹ 2 inch flotation layer.

When it is necessary to remove paint from the surface of a piece of metal, it is mandatory that the piece of metal be dried and absolutely free of water. When the drying phase has been completed, the part is then immersed in the stripper solution and allowed to remain therein for a period of from 5 to 30 minutes at which time the paint usually will be completely disintegrated and easily flushed by a stream of cold water from the surface of the metal. If on the other hand, some paint remains at the end of the immersion time, the part must be re-dried completely before re-immersion. When all of the paint and the products of removal are no longer evident on the surface of the stripped metal part, the same is then dried for further processing.

Very frequently, it is necessary to remove the paint from a surface that may be inclined, or from some small area on the surface of a large piece of metal. In either event, the same basic formulation of the immersion type stripper, as heretofore described, is used together with a suitable thickner such as sub-microscopic pyrogenic silica. This material is known commercially as "Cabosil" and in the basic formulation is used to the extent as indicated in the following thixotropic compositions:

| Thixotropic formulation: | Grams |
| --- | --- |
| Sulfuric acid (specific gravity 1.84) | 175–225 |
| Chromic acid ($CrO_3$) | 15–25 |
| Sub-microscopic pyrogenic silica ("Cabosil") | 0.5–5.0 |

The mixing of the pyrogenic silica is carried out after the basic formulation has been prepared. Complete mixing of the silica is brought about by vigorous agitation as used in the preparation of the basic material composition. Due to the extreme fluffiness or lightness of the "Cabosil" material, it is required that the same be added slowly to the solution to prevent dispersion into the air.

Since the use of the thixotropic material is not too frequent, of necessity, it will be kept in a closed container. Under these conditions, there can be no absorption or influx of water into the material, and it therefore becomes unnecessary to have a barrier material such as the aforementioned carbon tetrachloride which is required in the use of the immersion solution.

In using the thixotropic composition, it is only necessary to swab or brush on the thickened material over the area from which the paint is to be removed. After a period of from 5 to 30 minutes, a damp rag is used to remove the majority of the deposit that still remains, and this is then followed by application of dry rags or paper toweling of some description to dry off the area from which the paint has been removed.

The novel principles of this invention transcend the scope of the invention as suggested or implied by the several embodiments hereinbefore described, and the invention may be embodied in other forms or carried out in other ways which have been conceived and reduced to practice during the course of this development, without departing from the spirit or essential characteristics of the invention. The embodiments disclosed herein therefore are to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A non-aqueous paint film remover composition for removing protective paint films of a highly polymerized resinous type from the surfaces of aluminum, ferrous alloys, and titanium by a disintegrating action on the film without an accompanying attack on the underlying metallic surface consisting of sulfuric acid (sp. gr. 1.84) for disintegrating the film and chromic acid for inhibiting attack of the acid on the metal surface, said composition consisting of from 15–25 grams of the chromic acid ($CrO_3$) for each 175–225 grams of the sulfuric acid ($H_2SO_4$).

2. A paint film remover as in claim 1 wherein the composition in the form of an immersion solution operable at ambient temperature and having carbon tetrachloride ($CCl_4$) as a floating moisture barrier layer of specific gravity intermediate between that of the composition solution and water.

3. A paint film remover as in claim 1 wherein the composition further consists of from 0.5–5.0 grams of a sub-microscopic pyrogenic silica thickener to render the same thixotropic and thus suitable for use as a brush on material.

4. A paint film remover as in claim 1 wherein the chromic acid is in a finely divided state.

5. A paint film remover as in claim 4 wherein the composition is in the form of a heavy suspension resulting from the slow admixture of the finely divided chromic acid to the sulfuric acid during vigorous agitation of the latter.

6. A method of removing highly polymerized resinous type paint films from the surfaces of a metallic object formed of a metal from the group consisting of aluminum and its alloys, stainless steels, high nickel alloys and titanium by disintegration of the film without attack on the underlying metallic surface comprising the steps of immersing the painted object for a period of from 5 to 30 minutes in a non-aqueous composition operative at ambient temperature, said composition consisting of from 175–225 grams of sulfuric acid ($H_2SO_4$) and from 15–25 grams of chromic acid ($CrO_3$) and formed by slowly adding the chromic acid in a finely divided state to the sulfuric acid and vigorously agitating the sulfuric acid during said addition of the chromic acid thereto until the admixture composition converts to a brown suspension, and rinsing the object in a stream of water following withdrawal from the composition.

References Cited

UNITED STATES PATENTS

| | | |
|---|---|---|
| 2,256,449 | 9/1941 | George. |
| 2,913,418 | 11/1959 | Sohngen et al. _____ 252—163 |
| 3,072,579 | 1/1963 | Newman _____ 252—143 |
| 3,138,556 | 6/1964 | Goldsmith et al. _____ 252—136 |
| 3,261,710 | 7/1966 | Waldman _____ 252—100 XR |
| 3,325,415 | 6/1967 | Kenny et al. _____ 252—144 |

LEON D. ROSDOL, *Primary Examiner.*

MAYER WEINBLATT, *Examiner.*